Patented Oct. 30, 1928.

1,689,860

UNITED STATES PATENT OFFICE.

FRANK A. CANON AND CHESTER E. ANDREWS, OF PITTSBURGH, PENNSYLVANIA, ASSIGNORS TO THE SELDEN COMPANY, OF PITTSBURGH, PENNSYLVANIA, A CORPORATION OF DELAWARE.

PROCESS OF PRODUCING PHTHALIC ANHYDRIDE.

No Drawing. Original application filed June 20, 1922, Serial No. 569,735. Divided and this application filed November 7, 1925. Serial No. 67,685.

In the art of exothermic chemical reactions very practical difficulties have been experienced in dissipating the excessive heat thereby generated.

In the air oxidation of naphthalene to phthalic anhydride the optimum temperature is above 400° C., lying roughly between 400° C. and 450° C., but much higher temperatures will also be reached unless prevented.

It is the object of the present invention to provide an improved process for carrying out exothermic chemical reactions of this character which will permit the zone of reaction to reach and maintain a desired operating temperature, but will prevent its rise to an abnormal degree thereabove, the process being substantially automatic in operation.

The present application is a division of application, Serial No. 569,735, filed by us on June 20, 1922.

In processes of the above character in which the lower operating temperatures obtain, water has been employed as a cooling agent, and in some respects has ideal characteristics. It is easily obtained, has great thermal capacity and can be conveniently directed and controlled. If properly brought into heat transferring relationship to the catalyst and the reacting vapors, it will be caused to boil. This will result in the absorption of great quantities of heat from the catalyst and the reacting gases because of the large amount of heat (latent heat of vaporization) required to effect its boiling operation.

The use of mercury has been proposed but this material presents serious difficulties. In the first place its boiling point is too low for successful application without special though well-known methods of treatment which add materially to the cost of operation. Its high cost makes unlimited use, like that of water prohibitive. In addition it has a relatively low heat capacity and a relatively low rate of heat conductivity. It is also subject to oxidation and its high specific gravity necessitates special and costly means for supporting and containing it.

In carrying out the present invention we have discovered that if a composite metal, consisting of one or more metals that will boil below the desired temperature of the reaction and one or more metals that will boil above the said desired temperature of the reaction, is formed in proper proportions, and this composite metal is placed in heat-transferring relation to the catalyst and the reacting gases, it will be caused to boil at a temperature close to but slightly below the desired temperature of the reaction and may be thus made to control the temperature of the reaction and keep the same well within maximum limits while permitting it to reach and maintain an efficient minimum. In addition this composite metal will have a low melting point, great thermal capacity and conductivity and relatively low specific gravity.

Taking the air oxidation process of converting naphthalene to phthalic anhydride as an example of the practical application of the invention, a heated mixture of air or other oxygen containing gas and naphthalene in the vapor phase and at a suitable temperature is brought into the presence of a suitable catalyst, for instance, vanadium oxide. The naphthalene is thereby converted into phthalic anhydride and a large amount of heat is thereby generated, resulting in high temperatures unless controlled. The reaction temperature as above stated should run between 400° and 450° C. and the desired temperature for the most effective working of this conversion process is ordinarily at approximately 425° C. Obviously temperatures materially above the same are not only undesirable but experience has demonstrated that very high temperature is detrimental to the product and apt to be disastrous to the reaction apparatus.

If cadmium which boils at 778° C. and mercury which has a boiling point at 357° C. be mixed in certain proportions a composition can be obtained having a boiling point which is close to that of the desired reaction temperature. Thus a composition made up of 12%, by weight, of cadmium and 88% by weight of mercury, is semi-liquid at 20° C. and has a boiling point of approximately 370° C., whereas 40% by weight of cadmium combined with 60% by weight, of mercury, is liquid at about 151° C. and boils at approximately 430° C. If a working reaction temperature of approximately 425° C. is taken as satisfactory, a boiling temperature of about 400° C. for the controlling composition is substantially satisfactory, and this can be obtained by a mixture of 25%, by weight of cadmium and 75% by weight of mercury. This particular mixture is liquid at about 100° C. and boils at approximately 400° C. The composition has other valuable features besides that of its boiling point. While the thermal conductivity of mercury is relatively low (.0189) that of cadmium is .215, so that the thermal conductivity of the composition is high, which is an important factor that assists it in its heat-dissipating qualities. Moreover the specific gravity of the composition is less than that of mercury, the latter being 13.5 while cadmium is 8.6.

In practicing the process the composite metal is brought into heat transferring relation to the zone of reaction by any suitable or obvious means, being held in a suitable container through the walls of which the heat of reaction will pass to the metal, causing the latter to boil and thereby absorb such heat. The vapors thus generated may be collected, condensed and returned to heat transferring relationship to the zone of reaction for reuse, the low melting point of the metal making this easy of accomplishment.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What we claim, is:

1. The process of converting naphthalene to phthalic anhydride, which consists in subjecting a mixture of naphthalene vapor and an oxygen-containing gas to a catalyst at a temperature ranging approximately between 400° C.—450° C., and maintaining said temperature by transmitting the excess heat generated to a composition of cadmium and mercury that will boil at said temperature and causing the composition to be boiled by said excess heat.

2. The process of converting naphthalene to phthalic anhydride, which consists in subjecting a mixture of naphthalene vapor and an oxygen-containing gas to a catalyst at a mean temperature of approximately 425° C. and maintaining approximately said temperature by transmitting the excess heat generated to a composition of cadmium and mercury that will boil at approximately 400° C. and causing said excess heat to boil said composition.

3. The process of converting naphthalene to phthalic anhydride, which consists in subjecting naphthalene vapor and an oxygen-containing gas to a catalyst and preventing excessive heating by maintaining a composition of substantially 75% of mercury and 25% of cadmium in heat-transferring relation therewith and causing said composition to be boiled by the excess heat.

4. The air oxidation process of converting naphthalene to phthalic anhydride, which consists in causing a mixture of naphthalene vapor and air to react in the presence of a catalyst of vanadium oxide, maintaining a reaction temperature range between approximately 400° C. and 450° C., and preventing an excessive temperature of the catalyst and vapors by causing the excess heat of the reaction to boil a composition of approximately 75% mercury and 25% cadmium.

5. A process of converting naphthalene to phthalic anhydride, which consists in subjecting naphthalene vapor and an oxygen-containing gas to a catalyst and preventing excessive heating by maintaining a composition of mercury and cadmium boiling at approximately the desired reaction temperature in heat transferring relation to the catalyst and causing said composition to be boiled by the excess heat of the reaction.

In testimony whereof, we affix our signatures.

FRANK A. CANON.
CHESTER E. ANDREWS.